Patented June 18, 1940

2,205,043

UNITED STATES PATENT OFFICE 2,205,043

IRON OXIDE BRIQUETTE

George S. Mican, Ralph H. Steinberg, and Stephen F. Urban, Chicago, Ill.

No Drawing. Application November 17, 1937, Serial No. 175,170

13 Claims. (Cl. 75—56)

This invention relates to compacting comminuted oxides in the form of briquettes primarily for use in the production of steel in open-hearth, electric and blast-furnaces, and the like.

It is the usual practice to add comminuted oxides containing a relatively large amount of the oxides of iron to the molten metal in furnaces as a decarbonizing agent, or to blast-furnaces for the purpose of reducing them to iron. Such oxides are usually introduced into the furnaces at a suitable time before the heat is tapped. Heretofore, a large portion of these comminuted oxides were either caught by the slag floating therein on top of the metal, or were carried out of the furnaces by the gases, thereby allowing only a very small portion of the oxides to reach the bath of molten metal, which was, of course, very undesirable. It has been suggested to compact these comminuted oxides into a solid mass which, when introduced into the furnaces, would penetrate the floating slag and fall directly into the bath of metal to thoroughly react therewith.

It is, therefore, an object of this invention to provide a compact mass of comminuted oxides which will readily penetrate the floating slag and to speed the reaction of the oxides with the molten metal.

It is another object of this invention to provide a means for introducing comminuted oxides into furnaces whereby substantially the entire amount of oxides introduced will be used and the waste reduced to a minimum.

The comminuted oxides, used for such purposes as has been described, usually are by-products of certain operations in the manufacture of steel, such as mill scale, flue dust, ore fines, etc. In accordance with the present invention, it has been found that the iron oxides can be formed into a compact mass in the form of briquettes, or blocks, of the desired shape and size by mixing them with water-glass as a binder, that is, a sodium silicate solution, and allowing the combined mixture to dry and harden to firmly unite the mixture into a dry solid mass. The proportion of water-glass used as a binder depends on the firmness and density of finished briquettes, or blocks, desired. For most purposes, it has been found that about 5 per cent. of water-glass diluted with an equal volume of water when mixed with oxides of iron and allowed to dry and harden into a compact solid mass, either in the air or in an oven at a suitable temperature, produces briquettes which seem to be practical for any use.

It may be desirable for certain reasons to provide briquettes in which the iron oxides are more firmly bound together, producing a briquette of considerable strength which is especially desirable if they have to be handled or transported any distance in order to prevent breakage and crumpling. Such a briquette can be produced by mixing the comminuted iron oxides with a solution of water-glass and a calcareous material, such as limestone or dolomite. The calcareous material should be crushed very fine to almost a pulverized state before being introduced into the mixture, and the water-glass should be preferably diluted with an equal volume of water for the best results.

It has been found that a briquette required for most uses can be obtained by using 5 to 7 per cent. calcareous material, but as low as 2 per cent. and as high as 10 per cent. can be used, or even higher for some uses. It is preferable to dry and harden the briquettes into a compact mass by placing them in an oven or furnace having a temperature of from 600 to 700 degrees Fahrenheit. It has been found that within this temperature range the briquettes can be dried and hardened in about a half hour which is, of course, a reasonable length of time for such an operation.

While we have described a specific embodiment of the present invention, it will be seen that we do not wish to be limited exactly thereto, since various modifications may be made without departing from the scope of the invention, as defined by the following claims.

We claim:

1. The method of forming a compact mass of comminuted oxides into briquettes for use in oxidizing or decarburizing molten metal in reducing furnaces which comprises mixing an iron oxide with a mixture of water-glass and from 2 to 10 per cent. of a calcareous material, and heating the combined mixture at a temperature of from 600 to 700 degree Fahrenheit for about one-half hour to harden and firmly unite the same into a dry, solid mass.

2. The method of forming a compact mass of comminuted oxides into briquettes for use in oxidizing or decarburizing molten metal in reducing furnaces which comprises mixing an iron oxide with a mixture of about 5 per cent. water-glass which has been diluted by an equal volume of water, and a calcareous material, and heating the combined mixture at a temperature of from 600 to 700 degrees Fahrenheit for about one-half hour to harden and firmly unite the same into a dry, solid mass.

3. The method of forming a compact mass of comminuted oxides into briquettes for use in oxidizing or decarburizing molten metal in reducing furnaces which comprises mixing an iron oxide with a mixture of about 5 per cent. waterglass which has been diluted by an equal volume of water and from 2 to 10 per cent. of a calcareous material, and heating the combined mixture at a temperature of from 600 to 700 degree Fahrenheit for about one-half hour to harden and firmly unite the same into a dry, solid mass.

4. A decarburizing body for use in open hearth furnace operation comprising mill scale and a binder comprising sodium silicate binding the scale together into a unitary mass.

5. A compact mass of comminuted iron oxides in the form of a briquette for use in oxidizing or decarburizing molten metal in reducing furnaces comprising mill scale, a calcareous material, and a binder consisting of sodium silicate for firmly binding the scale and the calcareous material together into a solid mass.

6. The method of forming a compact mass of comminuted oxides into briquettes for use in oxidizing or decarburizing molten metal in reducing furnaces which comprises mixing mill scale with sodium silicate, and heating the combined mixture so as to harden and firmly unite the same into a dry solid mass.

7. The method of forming a compact mass of comminuted oxides into briquettes for use in oxidizing or decarburizing molten metal in reducing furnaces which comprises mixing mill scale with sodium silicate and a calcareous material, and heating the combined mixture so as to harden and firmly unite the same into a dry solid mass.

8. A compact mass of comminuted iron oxides in the form of a briquette for use in oxidizing or decarburizing molten metal in reducing furnaces comprising mill scale and a binder consisting of approximately 5 percent of sodium silicate binding the scale together into a unitary mass.

9. The method of forming a compact mass of comminuted oxides into briquettes for use in oxidizing or decarburizing molten metal in reducing furnaces comprising mixing together mill scale and a sodium silicate solution and thereafter permitting the sodium silicate to set for binding the scale together into a unitary mass.

10. The method of forming a compact mass of comminuted oxides into briquettes for use in oxidizing or decarburizing molten metal in reducing furnaces comprising mixing together mill scale and a sodium silicate solution, with sufficient water present to insure the coating of the particles of scale with the sodium silicate solution, and thereafter permitting the sodium silicate to set for binding the scale together into a unitary mass.

11. The method of forming a compact mass of comminuted oxides into briquettes for use in oxidizing or decarburizing molten metal in reducing furnaces comprising mixing together mill scale and approximately 5 percent of a sodium silicate solution, and thereafter permitting the sodium silicate to set for binding the scale together into a unitary mass.

12. The method of forming a compact mass of comminuted oxides into briquettes for use in oxidizing or decarburizing molten metal in reducing furnaces comprising mixing together mill scale and a sodium silicate solution with an added water content of the mixture sufficient to insure the complete coating of the particles of scale with the sodium silicate solution.

13. The method of forming a compact mass of comminuted oxides into briquettes for use in oxidizing or decarburizing molten metal in reducing furnaces, which comprises mixing together mill scale and approximately 5 percent of sodium silicate which has been diluted with approximately an equal volume of water.

GEORGE S. MICAN.
RALPH H. STEINBERG.
STEPHEN F. URBAN.